Feb. 25, 1936.　　　　E. BOECKING　　　　2,031,756
FILM FEEDING MECHANISM FOR FILMS HAVING SOUND TRACK
Filed March 8, 1934　　　3 Sheets-Sheet 1

INVENTOR
Ewald Boecking
BY
ATTORNEY

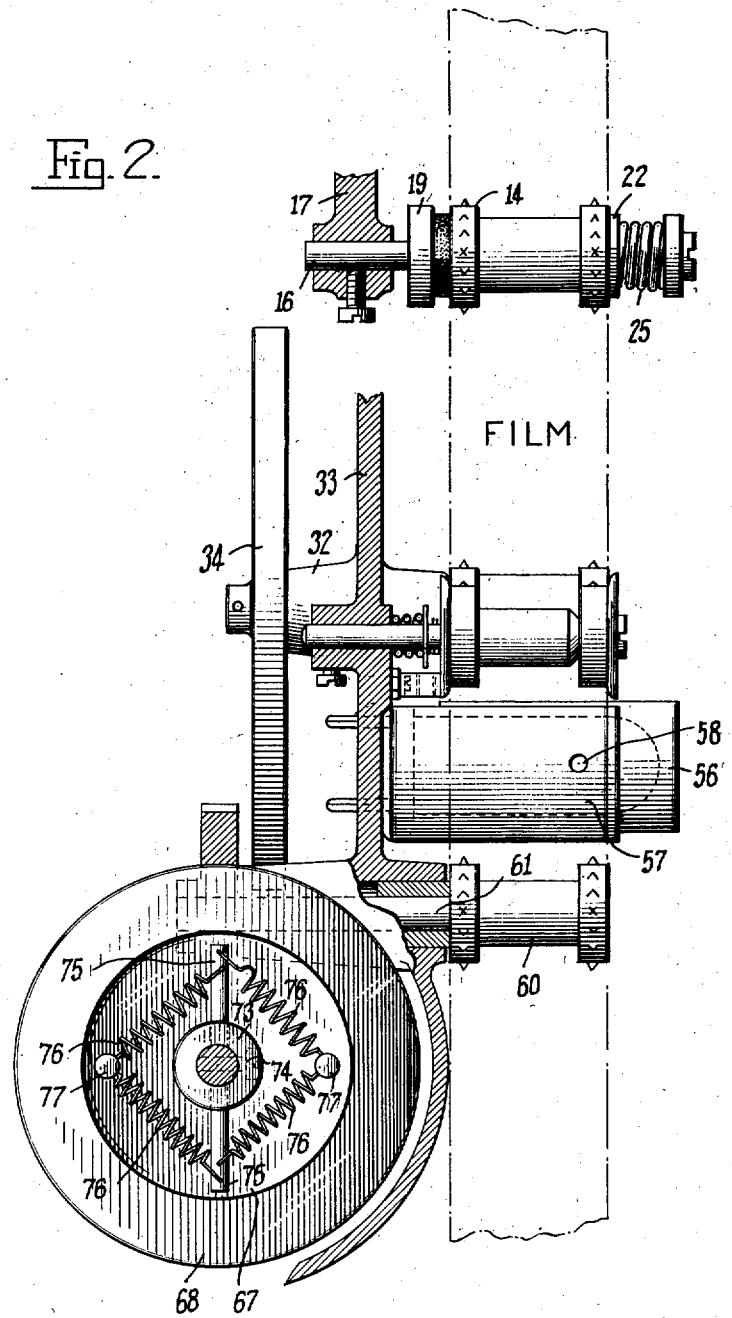

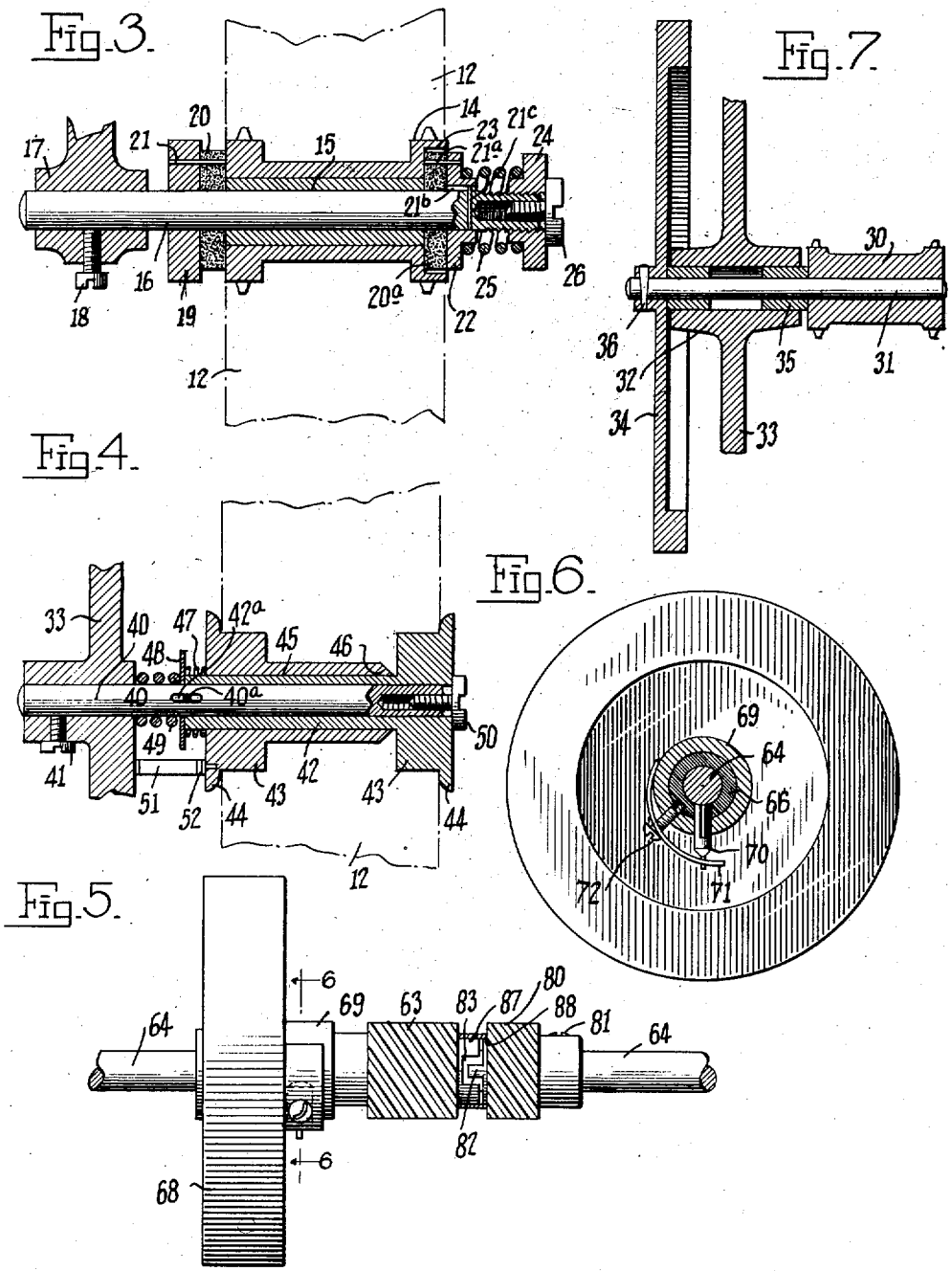

Patented Feb. 25, 1936

2,031,756

UNITED STATES PATENT OFFICE 2,031,756

FILM FEEDING MECHANISM FOR FILMS HAVING SOUND TRACK

Ewald Boecking, Brooklyn, N. Y., assignor to International Projector Corporation, New York, N. Y., a corporation of Delaware Application March 8, 1934, Serial No. 714,571

11 Claims. (Cl. 271—2.3)

This invention relates to new and improved mechanism for feeding or pulling a film at constant speed, for instance through a sound recording or reproducing mechanism, or similar device. The invention has been developed and is especially useful in connection with machines for exhibiting talking motion pictures, though it is also useful wherever a film should travel at a uniform speed, as is particularly desirable and important in connection with recording, printing and reproducing of sound records.

Those familiar with talking motion pictures will appreciate the importance of feeding the film at a uniform speed through the recording, printing or reproducing devices in order to obviate rasping or other objectionable noises in the speaker and in order to simulate insofar as possible the original tones, and they will also understand the difficulties in the path of improvements in this field.

A feature of the present invention is to provide improved apparatus for the purposes mentioned.

Another feature of the invention resides in the provision in apparatus of this character of novel and superior mechanism for controlling the feeding of a film.

Still another feature is the provision of a novel driving mechanism for certain of the sprockets, which mechanism is capable of relieving the film of jolts or jerks which are probably due principally to imperfectly cut or worn gear teeth, or to fluctuations in the power supply, or both.

A more specific feature resides in the provision of novel and improved mechanism for placing a film under tension or drag in advance of the sound device or gate, or in other words for promoting a uniform feed of the film in front of a definite point.

Still another feature is the provision of such mechanism which is reasonably simple and inexpensive to manufacture, efficient in operation and durable in service.

A further feature resides in providing improved guiding mechanism for properly aligning the film with a sound recording, printing or reproducing device.

Other features, objects and advantages of the invention will be pointed out or become apparent in connection with the following detailed description of one form of construction illustrating the invention, reference being had to the accompanying drawings, wherein:

Fig. 2 is an elevation, also partly in section, of the mechanism shown in Fig. 1, looking from the front or left hand side of Fig. 1, the intermittent mechanism and a portion of the sound device being omitted;

Figs. 3 and 4 are vertical sections, on enlarged scale, of certain portions of the mechanism illustrated in Figs. 1 and 2;

Fig. 5 is a side elevation, partly in section, of another portion of said mechanism;

Fig. 6 is a vertical section taken on the line 6—6 of Fig. 5, looking in the direction of the arrows; and Fig. 7 is a vertical section of another portion of said mechanism.

Figure 1:
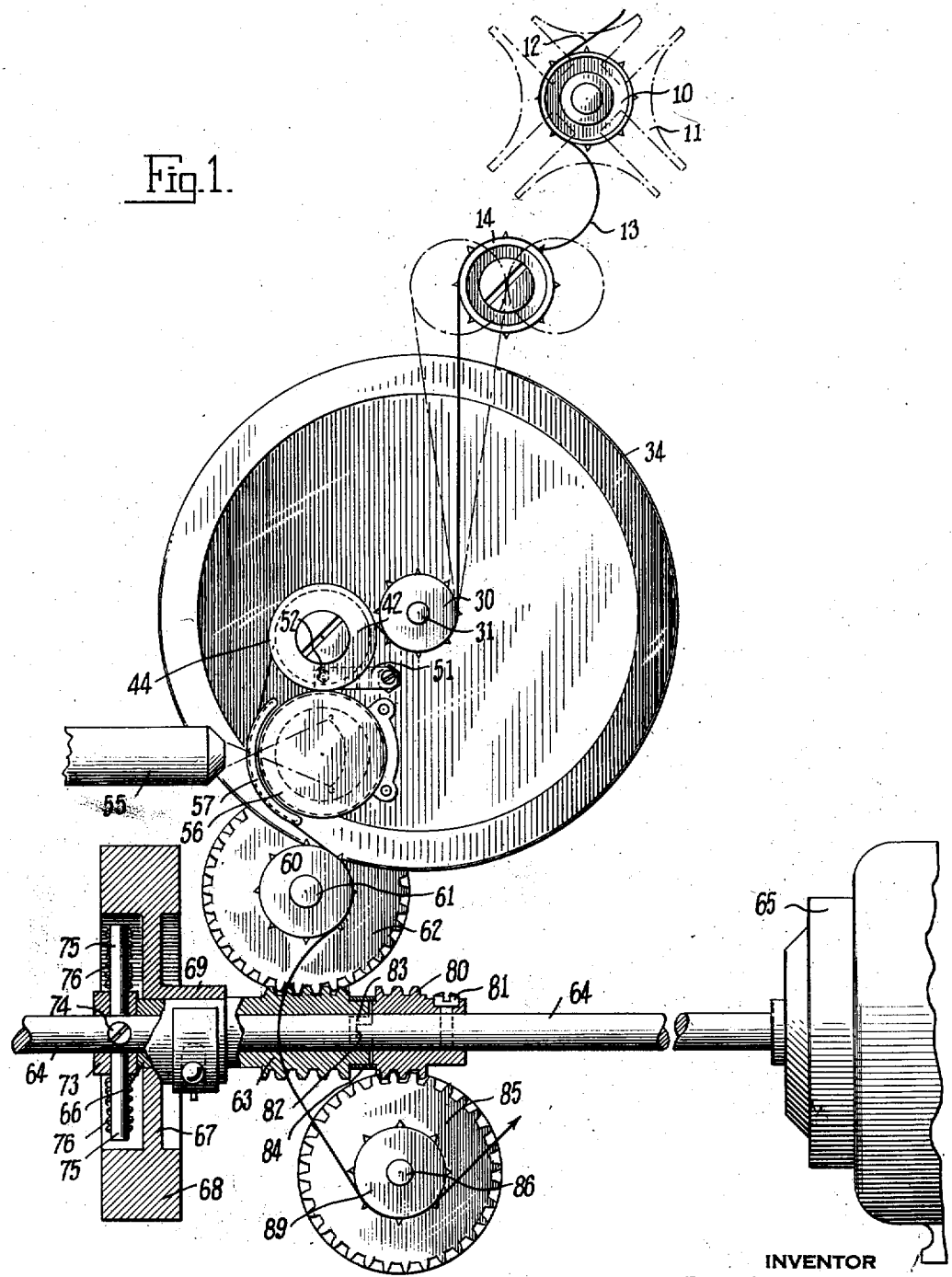
Fig. 1 is a side elevation, partly in section, of one form of mechanism in accordance with the invention, the supporting frame being here omitted.

In the construction illustrated in the drawings, a film sprocket 10, driven from the star wheel 11 of Geneva gearing, is provided for pulling a film 12 through a picture projecting portion (not shown) of a motion picture projecting machine, as is common practice where the same film contains both pictures and a sound record or track. However, if the film 12 is employed only for a sound record, as where the pictures are on a separate film, the parts 10 and 11 are not required for the film containing the sound track. Passing from sprocket 10, the film 12 forms a loop 13 between the sprocket 12 and a friction drag sprocket 14. In order to permit proper framing of the pictures, where they are on the same film as the sound track, and where the picture projecting devices are above the intermittent sprocket 10, the intermittent mechanism, sprocket 10 and sprocket 14 may all be mounted for horizontal sliding in any convenient manner, so that they are all moved together the desired distance to draw the film down and thus bring a given picture into frame with an aperture plate (not shown), before the machine is started. Possible end positions of the sprocket 14 are shown in dot and dash lines in Fig. 1.

In this manner, provision may be made for framing pictures while preserving the desired length of loop 13, and at the same time for enabling positive engagement of the sprocket 14 with the film for purposes hereinafter indicated. However, since the present invention is useful in connection with other types of film framing devices, and since means are described and claimed elsewhere for accomplishing the horizontal movement of the parts, these need not be described in detail herein.

As best shown in Fig. 3, the sprocket 14 may advantageously be mounted in the following manner. For instance, it may be secured to a bushing 15 which is journaled on a shaft 16, this shaft being mounted in any suitable portion 17 of the machine and secured against rotation, for instance by a set-screw 18. Secured in any suitable manner to shaft 16 is a collar 19, with which is engaged, as by a pin 21, a friction disc 20 which may be formed of felt, cork, rubber composition, or other yielding material adapted to bear against an end face of the sprocket and act as a friction brake or drag, in combination with other parts hereafter described. Opposite the other end of the sprocket 14 and free on shaft 16, there is provided a shouldered collar 22 to which is secured, as by pin 21a, a second friction disc 20a, which may lie within a recess 23 in the sprocket. The collar 22 may be maintained against turning with respect to the shaft, while being permitted to slide therealong, by means of a keyway 21b and pin 21c. Threaded onto the end of shaft 16 is a shouldered nut 24. A coil spring 25 is interposed between this nut and collar 22 and is supported on their shoulders. A headed bolt 26 is threaded into the end of shaft 16 and bears against nut 24, to lock the latter against rotation. A clearance is provided between the end of shaft 16 and the head of bolt 26 to permit requisite movement of the latter.

In this manner there is provided a simple and effective construction for adjusting the force imposed on the sprocket 14 by friction discs 20 and 20a. That is to say, by turning up the nut 24, the force exerted on spring 25, and consequently the friction against sprocket 14, may be adjusted to the proper, desired amount. When the nut 24 is in proper position either for initial setting or to compensate for wear of discs 20 after long use, the bolt 26 may be turned up against nut 24 and acts as a lock-nut. While the sprocket 14 and co-operating parts furnish an excellent means for the purposes mentioned, it will be appreciated that other retarding or loop-forming mechanism might be employed. That is to say, other suitable devices might be substituted for the sprocket 14, provided they are capable of exerting a drag upon the film and of maintaining a loop 13 between the intermittent device and the sound gate.

From the sprocket 14 the film preferably passes into engagement with the under side of an idler sprocket 30 (Figs. 1, 2 and 7), secured in any suitable manner to a shaft 31 which is journalled in a bearing 32, for instance by means of bushings 35. This bearing may conveniently be formed integral with an upstanding rigid portion 33 of the frame of the machine. If desired a disc or revolving member 34 of the character shown may be secured to the shaft 31 at a suitable point, for instance by pin 36. The idler sprocket is effective, especially when employed in combination with other features of the present improvement, for taking slack out of the film in advance of the film gate. However, if desired, a roller may replace sprocket 30.

It will be appreciated that in this construction the film engages the sprocket teeth of sprocket 14 and of sprocket 30, so that each of these sprockets is rotated by the film. A positive drag is thus imposed on the film.

The film passing from beneath sprocket 30 is preferably engaged by a device for edge guiding and precisely aligning the film with the sound gate and preferably for also exerting a drag on the film, in addition to the drag imposed by the sprocket 14 and cooperating elements. Such device may advantageously be constructed to operate in accordance with the example best illustrated in Fig. 4. In the construction illustrated, one end of a shaft 40 is secured in frame portion 33, as by a set-screw 41, and extends parallel to and below the shaft 16. Journalled on shaft 40 is a sleeve member 42 having an enlarged circular portion 43 provided with an end flange 44 for engaging an edge of the film. A sleeve member 45 is supported on the sleeve 42 for sliding axially with respect thereto and is also provided with a portion 43 and a flange portion 44, similar and opposed to like portions of sleeve 42. The end of sleeve 45 may be bevelled as at 46 and may be urged against portion 43 on sleeve 42 (when no film is in the machine) by a light coil spring 47 interposed between a collar 48 and the large end of sleeve 45. The collar 48 is slidable axially of shaft 40 and is urged against the small end of sleeve 42, which protrudes beyond the large end of sleeve 45, by means of a relatively heavy coil spring 49 bearing against the rigid frame portion 33. A headed bolt 50 is threaded into the right-hand end of shaft 40 and through its head engages the sleeve 42 and holds the parts in assembled relation. A suitable clearance is provided between the right-hand end of shaft 40 and the head of bolt 50 to permit desired lateral adjustment of the members 42 and 45, the adjustment being accomplished by turning the bolt to urge these members against the coil spring 49 which is thus placed under compression. The force of spring 49 may be sufficient to prevent sleeve 42 from turning under normal operating conditions, or a pin 40a may cooperate with slots 42a in the sleeve 42 and shaft 40, to prevent rotation therebetween. The sleeve 45 is preferably held against rotation by means of an arm 51 secured to frame member 33 and a pin 52, which is secured to member 45 and slides into a co-operating hole in arm 51.

There is thus provided a device for precisely aligning the film with the sound gate, and at the same time for exerting a friction drag on the film. More particularly, it will be noted that the length of member 45 is such that when a standard-size film is to be placed between the opposed flanges 44, the member 45 has to be moved slightly to the left against the action of light spring 47 in order to accommodate the film, thus providing a clearance between end 46 of the member 45 and the portion 43 of member 42. During operation of the machine, the film is thus yieldingly urged against the right-hand flange 44, which latter is firmly held against the rigid head on bolt 50 by the action of heavy spring 49. By simply turning the bolt 50, in the proper direction, the member 42 may be accurately adjusted to a position where its flange 44 engages the edge of the film adjacent the sound-track (compare Fig. 2), and thus, with the assistance of the spring-pressed member 45, accurately aligns the sound-track with respect to the film gate, immediately in advance of the gate. Upon adjusting the member 42, whether the film is then in the machine or not, the member 45 requires no separate adjustment.

When the film is properly threaded through the machine, it lies against the curved surfaces on portions 43, over a substantial portion of their circumferences, for instance, as shown in Fig. 1, and is pulled over these surfaces, by mechanism hereafter described. Where the member 42 is held against rotation, for instance by heavy spring 49, and the member 45 is also held against rotation, for instance as described, there is a definite drag imposed on the film by these members, directly in advance of the film gate, as is highly advantageous in order to prevent slack in the film opposite the gate and thus provide a precise cooperation between film and gate.

The sound device need not be described in detail as it may take any convenient, known form, and include a source of light 55, a photo-electric cell 56, and a gate 57 having an aperture 58 with which the sound track of the film is aligned. The film is preferably drawn taut along the surface of the gate by means of a sound sprocket 60, which pulls the film against the substantially constant drag imposed on it by means of the foregoing character. The sprocket 60 is advantageously driven at a substantially constant speed. For driving sprocket 60, mechanism of the following character results in a number of advantages, including uniformity of speed, as will become apparent.

For example, the sprocket 60 may be secured to one end of a shaft 61 (Fig. 2) which is journalled in the frame 33 in any convenient manner, and a gear 62 may be secured to the other end of this shaft and be engaged by a worm gear 63 (Figs. 1 and 5). The worm gear 63 is journalled on a shaft 64 which may be driven by an electric motor 65, directly or through a suitable or known type of filter (not shown), interposed between the motor 65 and shaft 64. Worm 63 is provided with a reduced sleeve portion 66, upon which there is mounted a disc or revolving member 67 having a rim 68 and a hub 69.

For causing the disc or revolving member 67 to rotate with the worm 63, and at the same time, for eliminating flutter between these parts and the drive shaft 64, as is particularly desirable where there is a resilient filter, such as is hereafter described, between the driving and driven elements, mechanism of the following character may advantageously be employed. For example, a bifurcated or pronged pin 70 extends into aligned openings in hub 69 of the revolving member 67 and in sleeve 66 of the worm 63, the ends of the prongs being tapered or curved and being yieldingly urged against the curved surface of shaft 64 by a leaf or flat spring 71, one end of which bears against or may be secured to hub 69 and the other end of which engages the outer end of pin 70. The spring 71 is engaged by a bolt 72, and acts as a lever, the force applied to the pin being adjusted by turning the bolt in the proper direction. The force applied may advantageously be sufficient as to spread the prongs to cause them to engage the walls of the openings in which they lie, but should not be so great as to prevent proper operation of the resilient filter or as to prevent backing out of the pin to avoid jamming of the parts under an excessive overload.

To the shaft 64, at the opposite side of disc 67 from the hub 69, there is secured, as by means of a bolt 74, a collar 73 (Figs. 1 and 2). In this collar there are mounted in any convenient manner a pair of opposed radial arms 75, to the outer ends of each of which are attached ends of pairs of coil springs 76, the other ends of these springs being attached to studs 77 secured to or formed integral with the disc 67.

It will thus be understood that a resilient drive is provided for the sprocket 60, the shaft 64 driving the disc 67 through arms 75 and springs 76, and the hub 69 of disc 67 being secured to the sleeve of worm 63, which drives gear 62 on sprocket shaft 61, the worm 63 being capable of rotational movement with respect to shaft 64.

There are also provided, in the mechanism shown, means for positively driving the worm 63 during starting up of the machine. A worm gear 80, for additional purposes hereafter mentioned, may be secured to shaft 64, by means of a bolt 81, and be provided with one or more feet 82, each of which extends into a slot 83 in the end of worm 63. The slots are preferably sufficiently wide to permit the resilient drive or filter to function as described during ordinary running conditions, so that jerks or jolts in the driving mechanism are not transmitted to the sound sprocket 60. At the same time the feet 82 and slots 83 cooperate to positively drive the worm 63 during starting up, thus relieving the springs 76 of excessive forces which would tend to weaken them or wear them out. After the parts are running the springs 76 take up the drive, and feet 82 are normally out of contact with the ends of slots 83, save possibly, if desired, under severe jolts of shaft 64. A spacing collar 84 may be provided to prevent end play of the worm 63, and this collar may seat on suitable shoulders 87, 88 formed on worm 63 and worm gear 80.

The worm 80, in addition to cooperating with worm 63 as described, serves to drive gear 85, which is secured to a shaft 86 on which is mounted a take-up sprocket 89 for feeding the film from sprocket 60 to a take-up reel (not shown), while providing slack portion between the sprocket 60 and sprocket 89, as is desirable.

There is thus provided a superior mechanism in which a simple and efficient driving mechanism pulls the film forward at a substantially constant speed, the resilient drive between the power shaft and the disc 67 being adapted to damp out or filter uneven power impulses, thus preventing them from being transmitted to the sprocket which pulls the film forward. A minimum number of gears and other parts are required in the mechanism and the construction is sturdy and durable. By applying the disc 67 to the driven member 63 additional smoothness may be achieved. Furthermore, by the positive drive provided during starting up, the resilient device is relieved of excessive stresses which would tend to weaken it or wear it out.

In addition, the mechanism includes means for exerting a highly constant drag on the film, thus tending to take slack out of the film and place it under a uniform tension in advance of the sound device, these means contributing to the constant speed of the film feed. By employing both the yielding drag means, preferably rotatable by the film, and the surfaces over which the film slides, especially good results are secured, though both may not in all cases be required. So, too, the idler sprocket construction aids the other parts in imparting a smooth travel to the film. The segregation of these features from the driving mechanism also appears to aid in promoting the desired advantages. While all these features contribute to the achievement of a constant film feed, it will be appreciated that certain of them may be combined or even omitted under some conditions, while the desired advantages may still be secured.

An excellent and positive alignment of the film with a sound device or other mechanism is produced by edge guiding means of the character described, particularly as the film is positively aligned on one edge while allowance is made at the other edge for some roughness or unevenness of the film. Moreover, adjustment of the guiding means is readily accomplished.

A particular feature of the present mechanism resides in the dampening device associated with the resilient driving means. The advantages of this construction may be summarized by reference to Figs. 2 and 6. By adjusting the force on pin 70, undesired flutter between the driving member (shaft 64) and the driven members (68 and 63) may be eliminated. In other words, if the resilient means (springs 76) tend to cause vibrations, these may be damped out by the device of the character described.

In addition, the mechanism is simple and inexpensive to build and assemble, is handy to the operator for adjustments and repairs, and involves minimum possibilities of wear and breakdown.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In a machine of the character described for feeding a film at constant speed past a fixed point, means for imposing a friction drag on said film, means for edge guiding the film immediately in advance of said point, an idler sprocket operatively interposed between the first-named means and the second-named means, and means to cause the film to travel into and out of engagement with each of said means.

2. In a device of the character described, opposed members for edge guiding a film, means to urge said members toward each other, means for adjusting the lateral alignment of both of said members simultaneously, and means for maintaining them stationary.

3. In mechanism of the character described, a device for preventing flutter between an annular member and a member therewithin, comprising a bifurcated member having tapered end portions adapted to bear against said second member, means in said annular member for receiving the bifurcated member, and yielding means adapted to exert a force on said bifurcated member to urge said tapered end portions against said second member.

4. In mechanism of the character described, including sound mechanism, a sprocket for drawing a film past the sound mechanism, a sprocket for engaging the film leaving the first sprocket, a shaft, a gear carried by said shaft and rotatable with respect thereto, resilient means for driving said gear from said shaft, driving connections between said gear and said first-named sprocket, a gear secured to said shaft, and driving connections between said gear and said second-named sprocket.

5. In mechanism of the character described including sound mechanism, a sprocket for drawing a film past sound mechanism, a sprocket for engaging the film leaving the first sprocket, a shaft, a gear carried by said shaft and rotatable with respect thereto, resilient means for driving said gear from said shaft, driving connections between said gear and said first-named sprocket, a gear secured to said shaft, and driving connections between said gear and said second-named sprocket, said gears being provided with a tongue and slot connection whereby the second gear positively drives the first under loads on the first in excess of normal.

6. In mechanism of the character described, means to exert a drag on a film, means to align the film laterally, means to pull said film, means to receive said film from the pulling means, and means comprising a single shaft for operating said pulling means and receiving means.

7. In mechanism of the character described, means to exert a drag on a film, means to align the film laterally, means to pull said film, means to receive said film from the pulling means, means comprising a single shaft for operating said pulling means and receiving means, said last-named means including a resilient connection between said shaft and said pulling means, and said pulling means comprising a disc on the driven side of resilient connection.

8. In a machine of the character described, power means, a shaft rotated by said means, a worm journalled on said shaft, a disc secured to the worm, a sprocket operatively connected with said worm, and resilient means for driving said disc from said shaft.

9. A device of the character described for edge guiding a film, comprising relatively movable members adapted to engage the edges of a film, relatively light yielding means for urging one of said members toward the other and against an edge of the film, an adjustable stop for determining the alignment of the other of said members, and relatively heavy yielding means for urging the other of said members against said stop.

10. In sound-on-film mechanism of the character described, intermittent means, constant speed means for drawing a film past a fixed point, loop-forming means operatively interposed between said intermittent means and said fixed point, and separate drag means interposed between the loop-forming means and said point.

11. The combination as claimed in claim 10, wherein said last named means comprise an idler sprocket and stationary means for edge-guiding the film.

EWALD BOECKING.